United States Patent Office 3,098,188
Patented July 16, 1963

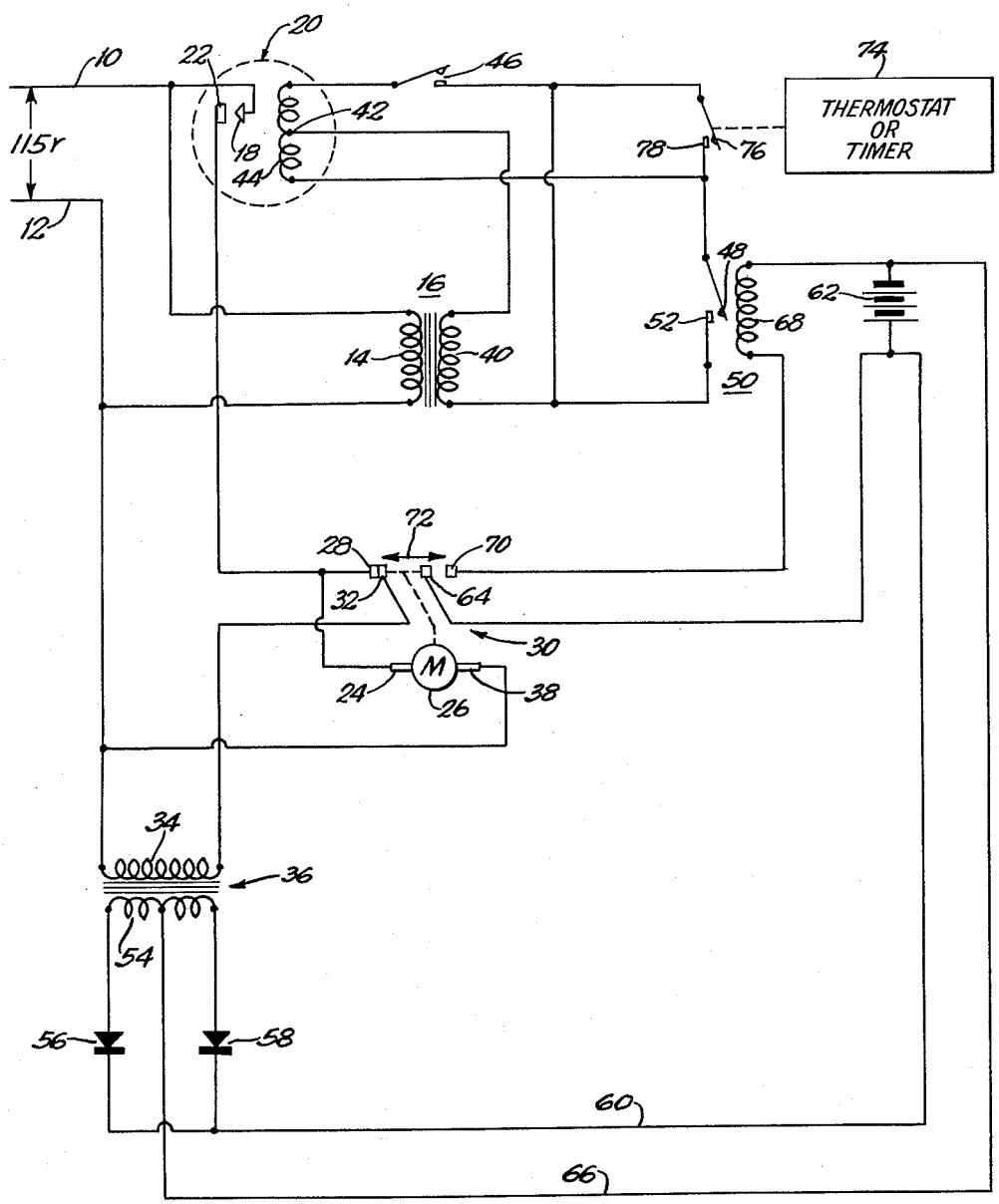

3,098,188
CHARGE TERMINATING CIRCUITS
Kenneth Dawkins, Minneapolis, Minn., assignor, by mesne assignments, to Studebaker Corporation, South Bend, Ind., a corporation of Michigan
Filed Mar. 21, 1960, Ser. No. 16,292
3 Claims. (Cl. 320—31)

This invention relates generally to battery charging systems and more particularly to an improved method and means for automatic termination of the charge to a storage battery.

Clearly, it is desirable to terminate the charging of a storage battery after a predetermined time has elapsed or after a predetermined condition has been reached to prevent the battery from being damaged. It has been a general practice in the use of prior art battery charging devices to provide automatic termination of the battery charging action in response to measurements of the on charge voltage or the on charge voltage and current at the battery. To this end, the prior art devices make use of magnetic relays, magnetic amplifiers, transistor triggered relays and the like for measuring the state of charge of a storage battery while current is passing therethrough.

Those skilled in the art appreciate that these prior art devices have not proved entirely satisfactory since their accuracy is effected by a considerable number of variable factors present in their use. Thus, such devices are subject to errors introduced by varying line voltage, high resistance as may be provided by corroded connections in the D.C. charging circuit, ambient temperature, battery size, battery condition and form factor of the charging circuit.

Accordingly, it is a general object of this invention to provide an improved battery charging method and means which substantially eliminates the above-described difficulties.

More particularly, it is an object of this invention to provide a new and improved method and means for measuring the charge on a storage battery and for automatically terminating the charging operation when the desired voltage is attained or when a predetermined condition has been reached.

In accordance with a novel feature of this invention, the charging source is periodically removed from the battery and a measurement of the battery open circuit voltage is made. Since it is well known that a storage battery will indicate its true state of charge only when on charge current is not passing therethrough, this open circuit voltage measurement serves to eliminate substantially all of the variable factors discussed above which heretofore have affected the accuracy of the prior art devices.

Thus, the invention comprises the periodic removal of the charging source from the battery, the measurement of the battery open circuit voltage during such times, and the provision of a suitable signal to automatically terminate the charging operation when the open circuit voltage measurements indicates the battery to be charged properly. This cyclic operation is repeated at a frequency determined by the type of battery application.

In accordance with a further feature of this invention, the charging action is automatically terminated if a predetermined battery temperature is reached or if a predetermined time has elapsed, even though the battery may not have reached its fully charged condition.

Those skilled in the art know that in some cases batteries, and particularly the lead-acid types, will not come to a final voltage if they are defective or have not properly been maintained. Thus, the shorting out of a cell in an otherwise good battery, or the contamination by antimony of the negatives of a lead-acid battery, prevent the battery from reaching the same final fully charged voltage which signals the end of charge in a good, well-maintained battery. Accordingly, suitable temperature sensitive means, such as a thermostat, or a suitable timing device advantageously may be utilized with the charging circuit to terminate the charging operation before any battery damage can take place.

It is another object of this invention to provide a new method and means for making open circuit voltage measurements during a battery charging operation and for automatically terminating the charging operation when the battery attains a fully charged condition.

It is still another obejct of this invention to provide a new method and means for automatically terminating a battery charging operation when the battery temperature exceeds a predetermined level in response to an excessive charge to prevent the battery from being damaged.

It is a further object of this invention to provide a new battery charging method and means wherein the charging operation is automatically terimnated after a predetermined charging time period has elapsed to prevent the battery from being damaged.

It is a still further object of this invention to provide a new battery charging method and means, as above, characterized by its relative accuracy, reliability and simplicity of construction.

The above and other novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which is shown a schematic diagram of an illustrative battery charging circuit with automatic termination embodying the invention.

The preferred illustrative embodiment of the invention shown in the drawing comprises a pair of power conductors 10 and 12 which advantageously are connected to a source of voltage, as for example, a source of 115 volt A.C. power. The power conductors 10 and 12 are connected to the terminals of the primary winding 14 of a step-down transformer 16. The power conductor 10 also is connected to a contact 18 of a power differential relay 20, which is comprised of the opposed windings 44 and 80. The other contact 22 of the power differential relay 20 is connected to a terminal 24 of an electric motor 26, forming a part of the timer 30, as well as to contact 28 of the timer 30.

The timer contact 28 is adapted to be placed into periodic engagement with a contact 32 of the timer 30, said contact 32 being connected to a terminal of the primary winding 34 of the power transformer 36. The other terminal of the primary winding 34 of power transformer 36 is connected to the power conductor 12. In addition, the terminal 38 of the electric motor 26 in the timer 30 is connected to the power conductor 12.

The secondary winding 40 of the step-down transformer 16 is connected at one terminal thereof to a center tap 42 between the windings 80 and 44 of differential relay 20, and at the other terminal thereof through a momentary contact switch 46 to one end of differential relay winding 80. The remote end of differential relay winding 44 is connected to a contact 48 of the sense relay 50 and the other contact 52 of sense relay 50 is returned to the secondary winding 40 of the step-down transformer 16.

The end terminals of the secondary winding 54 of power transformer 36 are connected through the diodes 56 and 58, respectively, to the rectifier output conductor 60, which in turn is connected to one terminal of the battery 62 to be charged and to a contact 64 of the timer 30. Another rectifier output conductor 66 is connected to a center tap on the transformer secondary 54 and to the other terminal of the battery 62 to be charged. In addition, the rectifier output conductor 66 is connected to one terminal of the sense-relay winding 68, the other terminal of which is connected to a contact 70 of the timer 30.

In accordance with a further illustrative feature of this invention, which may advantageously be utilized with the charging circuit, if desired, a thermostat or electric timer 74 is provided in operative association with the switch contacts 76 and 78. As shown in the drawing, the contact 78 is connected to the sense-relay contact 48 and the contact 76 is connected to the sense-relay contact 52, such that the thermostat or timer contacts 76 and 78 are connected in parallel with the sense-relay contacts 48 and 52.

The operation of the invention will now be described in detail from which its several novel and advantageous features may better be appreciated. When the momentary contact switch 46 is closed to initiate the charging operation, a circuit is completed between the secondary winding 40 of step-down transformer 16 and the winding 80 of the power differential relay 20, thereby energizing the power differential relay. This energization of the relay winding 80 causes the relay contacts 18 and 22 to close to apply power to the motor 26 of the electric timer 30. The electric timer 30 advantageously is of a type well-known in the art, wherein the motor operation and the cams associated therewith causes the contacts 32 and 64 to periodically engage with their associated contacts 28 and 70, respectively. Thus, the timer contacts 32 and 64 are moved in a periodic or cyclic manner in the direction indicated by the arrow 72, to alternately close a circuit between contacts 28 and 32 with contacts 64 and 70 being open, and then to close a circuit between contacts 64 and 70 with contacts 28 and 32 being open.

As stated above, with contacts 28 and 32 closed and contacts 64 and 70 open, as shown in the drawing, the energization of winding 80 of the power differential relay 20 causes power to be applied to the motor 26 of timer 30 and power also is applied through the contacts 28 and 32 to the primary winding 34 of the rectifier transformer 36. The rectifier circuit including the diodes 56 and 58 then apply a rectified D.C. voltage to the terminals of the battery 62 to be charged in a manner well understood in the art.

During this charging operation, the winding 68 of sense relay 50 cannot be energized since its circuit is open at the open contacts 64 and 70 of the timer 30.

It further will be appreciated that the power differential relay 20 advantageously may be of the type wherein the momentary closure of the contacts of switch 46 causes the relay contacts 18 and 22 to close and to remain in a closed condition even though the momentary contact switch 46 is released. Thus, the contacts 18 and 22 of the power differential relay 20 remain closed until such time as the relay winding 44 is energized by the closing of the contacts 48 and 52 of the sense relay 50 or by the closing of the contacts 76 and 78 associated with the thermostat or timer 74.

In accordance with a feature of this invention, the battery 62 is charged for substantially the entire cycle of the timer 30, and for a very short portion of the cycle the charging voltage to the battery 62 is removed and the battery is sensed in its open circuit condition to determine whether the fully charged condition has been reached. To this end, the electric motor 26 of timer 30 maintains the contacts 28 and 32 closed for the major portion of its cyclic period, and then for the remainder of its cyclic period the motor cams open the contacts 28 and 32 and close the contacts 70 and 72. As a result of this operation, the power to the rectifying circuit is removed so that the battery 62 no longer is being charged.

At the same time, the circuit for the sense-relay 50 is completed with the sense-relay winding 68 being connected directly across the battery 62. If the battery has not yet reached its fully charged condition, the sense relay 50 will not be energized and when the timer enters its next cycle of operation, the sense-relay circuit will be opened at the contacts 64 and 70 and the charge circuit for the battery will again be completed. This cycle of charging the battery and then removing the charging circuit to measure the battery open-circuit voltage is repeated at a frequency which is determined by the type of battery application. In the actual operation of the invention, for example, it has been found that in automotive charging service, a cycle of a fifteen minute charge period followed by a thirty second voltage sensing period is very satisfactory.

If during the voltage sensing period on the battery 62, the battery is in its fully charged condition, then the winding 68 of sense relay 50 will be energized to thereby close the contacts 48 and 52. This contact closure completes a circuit to energize the lower winding 44 in the power differential relay 20 to open the power relay contacts 18 and 22 and thereby terminate the charging cycle.

In addition to the circuit operation described above, it may be desirable to provide a thermostat or suitable period timer to limit the charging time of the period. In some cases batteries, and particularly lead-acid types, will not come to a final fully charged voltage if they are defective or have been abused. The shorting out of one cell in an otherwise good battery may prevent the charging source from ever bringing the battery to its final fully charged voltage. Under such conditions, it is possible that the automatic charge terminating circuit described above, which uses voltage as a measure, may continue to operate and possibly damage good cells of the battery.

Further, it is well known to those skilled in the art that the negatives of lead-acid batteries may become contaminated by antimony if neglected—as by leaving the battery in a dormant condition—and will not usually thereafter have the same fully-charged voltage which signals end of charge in a good, well-maintained battery. In view of these considerations, it may prove desirable to provide a thermostat or period timer 74 to limit the charging time of the battery. The normally open contacts 76 and 78 associated with the thermostat or timer 74 are provided in parallel with the contacts 48 and 52 of the sense relay 50 to close and thereby terminate the battery charging operation in the case of a defective or poorly maintained battery, as described above. Manifestly, if a thermostat is used in the element 74, such thermostat would be placed adjacent the battery since too much charge would result in the rising temperature therein to operate the thermostat and terminate the charge cycle. In lieu of the thermostat operation, any suitable period timer can be utilized to terminate the charging operation after a predetermined time period has expired.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What is claimed as the invention is:

1. The improvement of battery charging means comprising a source of charging voltage, a differential relay having a pair of opposed windings and relay contacts associated with said windings, said relay contacts being connected in circuit with said source of charging voltage upon energization of one of said opposed windings, cyclically operated switch means having a plurality of switch contacts, a first pair of said switch contacts connected between said relay contacts, said source of charging voltage and the battery terminals for applying the charging voltage to the battery during a portion of the switch cycle and for removing the source of charging voltage from the battery during the remainder of the switch cycle, a voltage responsive device, a second pair of said switch contacts connected between said voltage responsive device and the battery for connecting the battery to the voltage responsive device during the portion of the switch cycle when the source of charging voltage is removed from the battery whereby the voltage responsive device is responsive to the open circuit voltage of the battery, first switch means operatively associated with said voltage responsive device for automatically terminating the charging operation of said battery when the open circuit voltage of the battery exceeds a predetermined value, and second switch means connected in parallel with said first switch means for automatically terminating the charging operation of said battery in response to the occurrence of a predetermined event, said first and second switch means each serving upon actuation to energize the other one of said opposed windings to disconnect said source of charging voltage from said battery terminals.

2. The improvement of battery charging means in accordance with claim 1 further comprising a temperature sensitive element operatively associated with said second switch means, said temperature sensitive element being positioned adjacent the battery to sense the temperature thereof for operating said second switch means when the battery temperature reaches a predetermined value.

3. The improvement of battery charging means in accordance with claim 1 further comprising a period timing device associated with said second switch means for operating the latter when the charging time for said battery reaches a predetermined value.

References Cited in the file of this patent

UNITED STATES PATENTS

| | | |
|---|---|---|
| 920,103 | Case | Apr. 27, 1909 |
| 2,427,729 | Jenkins | Sept. 23, 1947 |
| 2,782,357 | Heyer et al. | Feb. 19, 1957 |
| 2,783,430 | Bower | Feb. 26, 1957 |
| 2,835,862 | McNutt | May 20, 1958 |